United States Patent
Amaya et al.

(10) Patent No.: US 6,181,090 B1
(45) Date of Patent: *Jan. 30, 2001

(54) DRIVE CONTROL METHOD FOR LINEAR OSCILLATING MOTORS AND A LINEAR OSCILLATING MOTOR

(75) Inventors: Hidetoshi Amaya; Yasuo Ibuki; Toyokatsu Okamoto, all of Kadoma (JP)

(73) Assignee: Matsushita Electric Works, Ltd., Osaka (JP)

( * ) Notice: Under 35 U.S.C. 154(b), the term of this patent shall be extended for 0 days.

This patent is subject to a terminal disclaimer.

(21) Appl. No.: 09/361,974

(22) Filed: Jul. 28, 1999

(30) Foreign Application Priority Data

Jul. 28, 1998 (JP) .................................................. 10-213306

(51) Int. Cl.$^7$ .................................................. H02K 33/16
(52) U.S. Cl. ........................ 318/128; 318/127; 318/126; 318/686; 310/50
(58) Field of Search .................... 310/36, 50, 12; 318/119, 126, 127, 128, 135, 686; 15/22.2; 388/900, 902, 903, 904, 937

(56) References Cited

U.S. PATENT DOCUMENTS

| | | | |
|---|---|---|---|
| 4,583,027 | 4/1986 | Parker et al. | 318/128 |
| 5,632,087 | 5/1997 | Motohashi et al. | 30/43.92 |
| 5,736,797 | 4/1998 | Mohotashi et al. | 310/36 |
| 5,921,134 | 7/1999 | Shiba et al. | 310/20 X |
| 5,955,799 | 9/1999 | Amaya et al. | 310/36 |

FOREIGN PATENT DOCUMENTS

| | | |
|---|---|---|
| 0349077 | 1/1990 | (EP) . |
| 674979 | 10/1995 | (EP) . |
| 0860933 | 8/1998 | (EP) . |
| 96/37347 | 11/1996 | (WO) . |

Primary Examiner—Nestor Ramirez
Assistant Examiner—Judson H. Jones
(74) Attorney, Agent, or Firm—Greenblum & Bernstein, P.L.C.

(57) ABSTRACT

A method for driving a linear oscillating motor and a linear oscillating motor are provided. The motor includes a fixed magnetic member, a movable member having a magnet and being supported to oscillate relative to the fixed magnetic member, a detector that detects displacement of the movable member, and a control that oscillates the movable member by sending drive current to a coil of the fixed magnetic member. The method includes controlling, during a first half-period that occurs within a full amplitude period of the movable member, the drive current based upon the output of the detector. The method also includes controlling, during a second half-period that occurs within a fill amplitude period of the movable member, the drive current based upon a fixed drive current waveform.

16 Claims, 4 Drawing Sheets

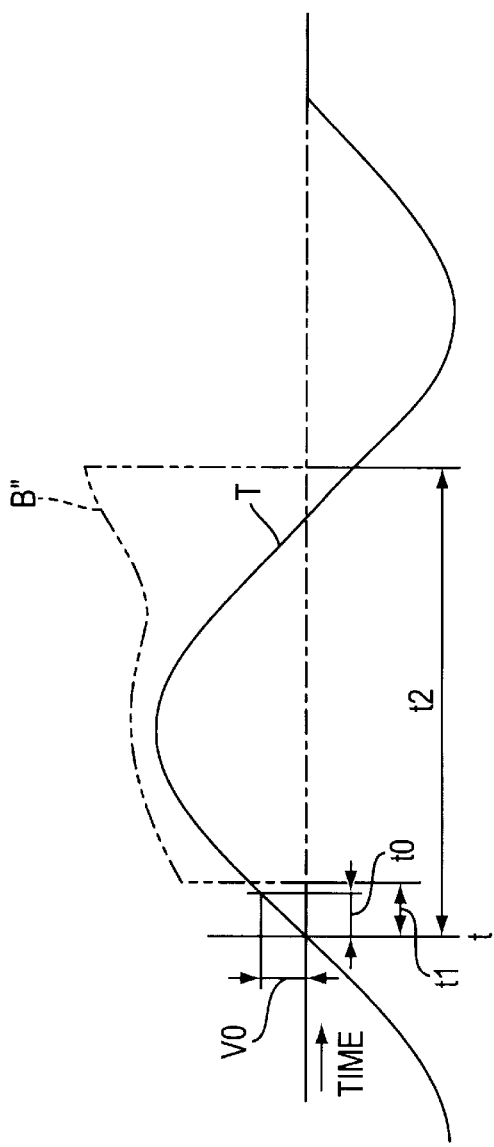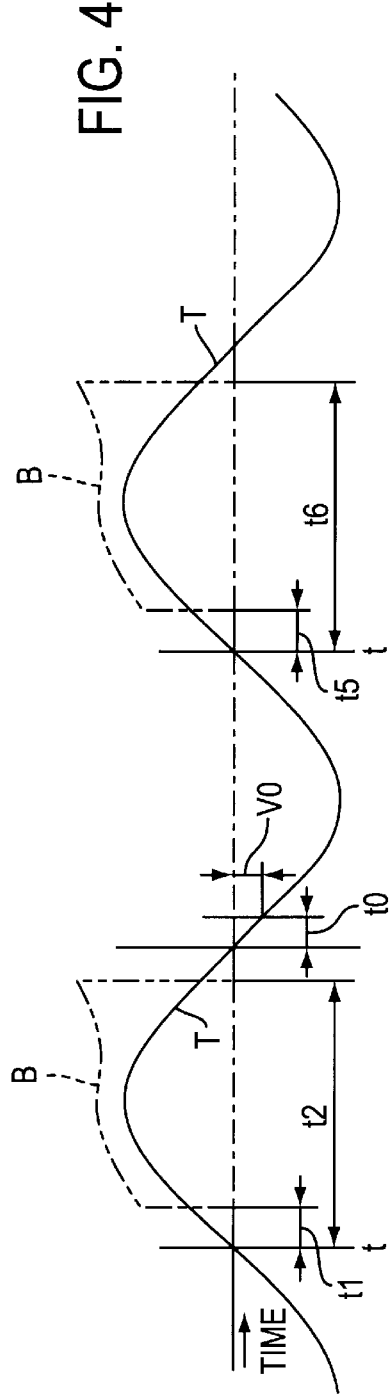

DRIVE CONTROL METHOD FOR LINEAR OSCILLATING MOTORS AND A LINEAR OSCILLATING MOTOR

CROSS-REFERENCE TO RELATED APPLICATIONS

The present application claims priority under 35 U.S.C. §119 to Japanese Patent Application HEI 10-213306, filed Jul. 28, 1998, the disclosure of which is expressly incorporated by reference herein in its entirety.

BACKGROUND OF THE INVENTION

1. Field of the Invention

The present invention relates to a method for driving of a linear oscillating motor during reciprocating oscillation, and a linear oscillating motor.

2. Discussion of Background Information

A linear oscillating motor includes a fixed magnet (e.g., an electromagnet). A movable member, which includes a magnet (e.g., an electromagnet or a permanent magnet), is supported relative to the fixed magnet to freely oscillate. A detector detects various oscillation parameters (e.g., amplitude, velocity, acceleration, etc.) of the movable member. In response to the output of the detector, a controller applies current to a coil of the fixed magnet to control oscillation of the movable member.

As the movable member oscillates, it generates a generally sinusoidal induced voltage within a magnetic detection coil adjacent the movable member. The period of full oscillation is separated into two half-periods (defined by the points at which the induced voltage is zero) over which drive control occurs.

When the oscillation frequency is relatively high, a high performance controller must be used to control the drive current since control must be based on a period shorter than the half-period. Such high performance controllers are expensive, and increase the overall cost of the device.

SUMMARY OF THE INVENTION

The present invention provides a method for driving a linear oscillating motor with high frequency oscillation without requiring the use of a high performance controller. The linear oscillating motor includes a fixed magnet (e.g., an electromagnet or a permanent magnet). A movable member is supported so as to freely oscillate relative to the fixed magnet, and is provided with an electromagnet or a permanent magnet. A detector detects displacement of the movable member relative to the fixed magnet. A controller generates a control current to control oscillation of the movable member, in response to the output of the detector. The controller provides a variable drive current (based upon the output of the detector) to oscillate the movable member during only one (a first half-period) of the two half-periods (making up the oscillation period of the movable member). During the other half-period (a second half-period), the controller oscillates the movable member according to a fixed drive current (waveform) which has a predetermined constant energy.

Based upon the output of the detector, the controller may optionally not apply the fixed drive current waveform during the other half-period (which may be considered as applying a zero current waveform). A variable drive current control region, defined as the region over the portion of the full period over which the controller applies variable drive current, may be expanded into the second half-period.

Furthermore, when the fixed drive current is not applied, the variable drive current control region may be adjusted based upon output of the detector. This can reduce fluctuation in amplitude of drive current within a full oscillation period.

The detector can detect displacement of the movable member during either or both of the half-periods.

According to an embodiment of the invention, a method for driving a linear oscillating motor is provided. The motor includes a fixed magnetic member, a movable member having a magnet and being supported to oscillate relative to the fixed magnetic member, a detector that detects displacement of the movable member, and a controller that oscillates the movable member by sending drive current to a coil of the fixed magnetic member. The method includes controlling, during a first half-period that occurs within a full amplitude period of the movable member, the drive current based upon the output of the detector. The method also includes controlling, during a second half-period that occurs within a full amplitude period of the movable member, the drive current based on a fixed drive current waveform.

A feature of the above embodiment provides for monitoring an output of the detector, and suppressing the fixed drive current waveform during the second half-period, such that no drive current is applied to the coil during the second half-period. The suppression of the drive current control can be adjusted based upon the output of the detector.

Detection of displacement of the movable member can occur during either or both of the first and second half-periods.

According to another embodiment of the invention, a method for driving a linear oscillating motor is provided. The motor includes a fixed magnetic member, a movable member having a magnet and being supported to oscillate relative to the fixed magnetic member, a detector that detects displacement of the movable member, and a control that controls oscillation of the movable member. The method includes detecting an oscillation parameter of the movable member; triggering variable control of oscillation of the movable member, where the variable control is based upon the oscillation parameter; terminating variable control triggering, fixed control of oscillation of the movable member, where the fixed control is independent of the oscillation parameter; and terminating fixed control.

According to features of the above embodiment, the magnet is a permanent magnet or an electromagnet.

According to another feature, after terminating fixed control, the method repeats from one of the detecting and the triggering variable control.

The above noted motor preferably includes a coil, and the further control applies a predetermined current waveform to the coil. The predetermined current waveform is zero current, or at least a portion of the predetermined current waveform is a non-zero current.

In another feature of the above embodiment, the movable member oscillates to define a period consisting of two half-periods, variable control occurs over one of the two half-periods, and fixed control occurs over the other of the two half-periods.

According to another embodiment of the invention, a linear motor is provided. A fixed magnet is provided. A movable magnet is supported by movable member. The movable member is supported to oscillate over a full-period relative to the fixed magnet. At least one of the fixed and movable magnets has a coil. The full-period includes first and second half-periods. A detector, mounted adjacent to the movable member, generates an output voltage based upon movement of the movable member. A control unit outputs a drive control current to the first coil over at least a portion of the first and second half-periods. The drive control current is based upon the output voltage during the first half-period, and is independent of the output voltage during the second half- period.

According to a feature of the above embodiment, the drive control is based on a predetermined drive current waveform during the second half-period. The predetermined current waveform is zero, or at least a portion of the predetermined drive current waveform is not zero.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein:

FIG. 3 is a timing chart of operation of another embodiment of the present invention based on output from the oscillation of the motor;

FIG. 4 is a timing chart of another embodiment of the present invention based on output from the oscillation of the motor;

DETAILED DESCRIPTION OF THE EXEMPLARY EMBODIMENT

Figure 2:
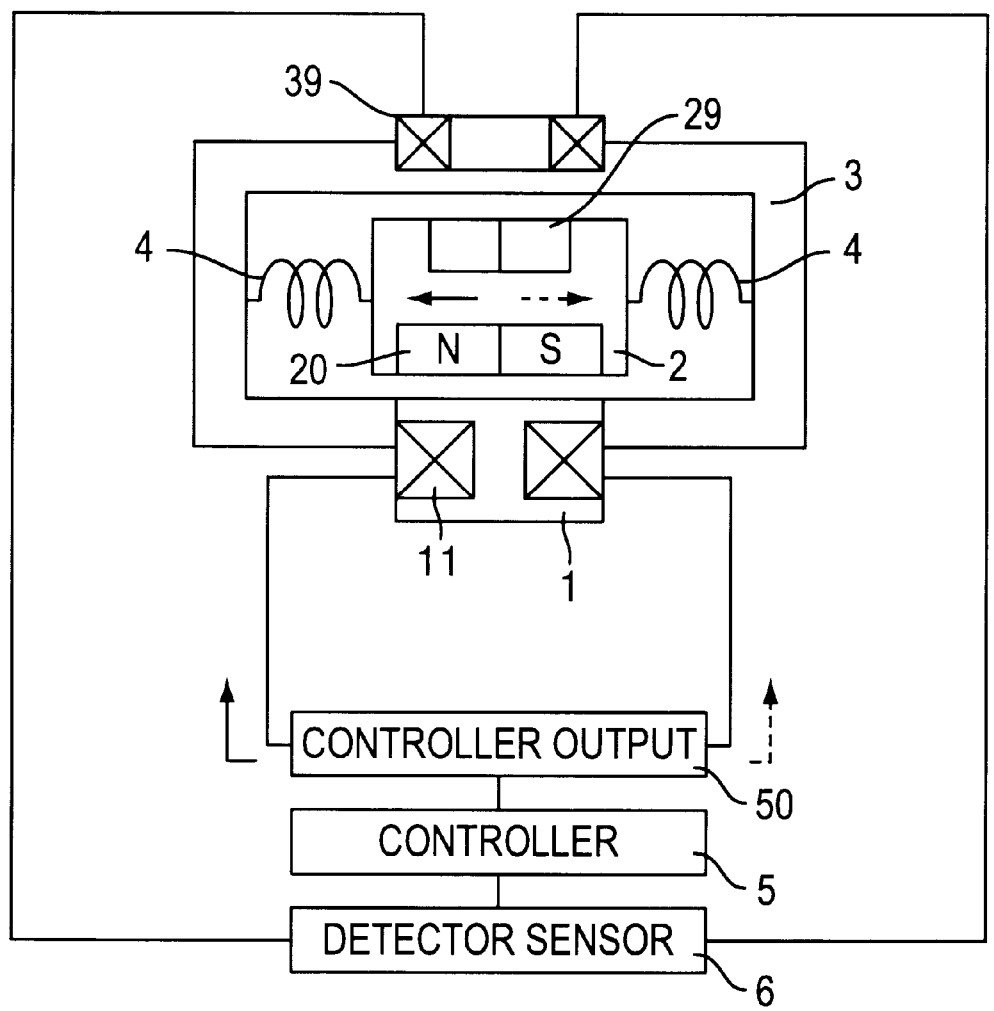
FIG. 2 is a block circuit diagram of an embodiment of the present invention.

Referring now to FIG. 2, an example of a linear oscillation motor is shown. A fixed member 1, which is an electromagnet with a coil 11 in the exemplary embodiment is mounted to a frame 3. A movable member 2 supports a first magnet 20 and a second magnet 29 (e.g., a permanent or electromagnets). Movable member 2 is mounted to opposing sides of frame 3 by springs 4 such that it can oscillate freely relative to frame 3. A magnetic detection coil 39, mounted on frame 3, outputs a voltage responsive to an oscillation parameter (e.g., displacement, amplitude, velocity, acceleration, etc.) of magnet 29 (and thus of movable member 2) relative to frame 3; in the exemplary embodiment, the parameter is displacement. A sensor 6 detects the oscillation parameter of movable member 2 from changes in the output of a magnetic detection coil 39. Controller 5 receives the output of sensor 6, and responds through a controller output 50 with a control drive current pulse width to coil 11 of fixed member 1.

Figure 1:
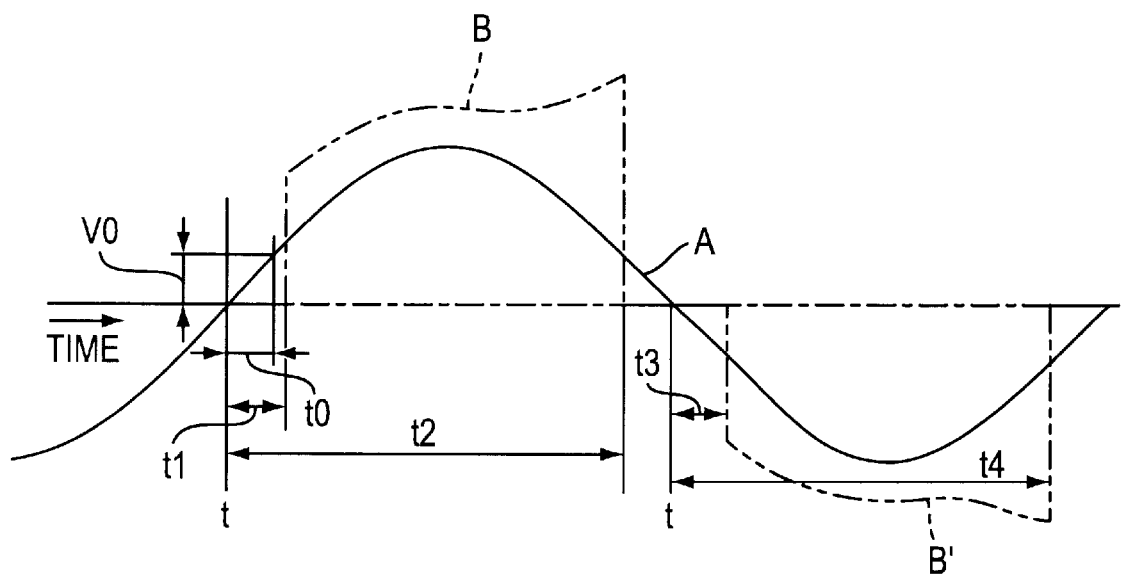
FIG. 1 is a timing chart of operation of the above embodiment based on output from the oscillation of the motor of the above-noted embodiment.

Referring now to FIG. 1, as movable member 2 oscillates, it generates a generally sinusoidal induced voltage A within magnetic detection coil 39. The induced voltage A is zero at the beginning and end of each half-period (i.e., an oscillation amplitude extreme), designated in FIG. 1 as time t. The amplitude of induced voltage A depends upon various parameters of the oscillation, e.g., amplitude, velocity, direction, etc. As discussed in more detail below, controller 5 sends a drive current B to coil 11 responsive to the amplitude of induced voltage A.

As noted above, induced voltage A is zero when movable member 2 is at an oscillation amplitude extreme. At a time $t_0$ after time t, the oscillation of movable member 2 generates a voltage $V_0$ (this can be regarded as equivalent to an oscillation amplitude value). Controller 5 responds with variable drive current B pulse width control to coil 11 between times $t_1$–$t_2$, where time $t_1$ is a slightly delayed from time $t_0$. During this time, controller 5 continues to monitor the output of coil 39 and adjust variable current drive B accordingly. If $V_0$ is large, then the oscillation amplitude is also large, and the corresponding interval between $t_2$ and $t_1$ is shorter. If $V_0$ is small, then the oscillation amplitude is also small, and the corresponding interval between $t_2$ and $t_1$ is longer.

As noted above, control in response to the detected oscillation parameter occurs during the noted half-period within a fill oscillation amplitude period. For the other half-period, a fixed drive current waveform B' is supplied to coil 11 from a time $t_3$ to time $t_4$, where time $t_3$ and time $t_4$ are fixed based upon the time t at which the oscillation crosses zero. Controller 5 can perform other control operations during this half-period, in addition to providing fixed drive current waveform B' to drive coil 11. The fixed drive current waveform is independent from the output of detector 6 during this half-period.

In the above embodiment, the variable drive current triggers and terminates in response to the output of coil 39 crossing the $V_0$ and $-V_0$ thresholds as noted. However, the invention is not so limited. Drive control can be carried out during a subsequent half-period based upon the voltage value $V_0$ detected during a current half-period. In response to the output of coil 39, the application of drive current is shifted by a period, such that control can be carried out even when the operation is slow. Such control is shown in FIG. 4, in which times $t_5$ and $t_6$ in the third half-period are based on the voltage value $V_0$ in the second half-period.

When applying a fixed drive current waveform within an amplitude oscillation half-period, the variable drive current control region is much shorter in comparison to an entire amplitude oscillation period, such that the amplitude oscillation control region decreases. In an alternative embodiment, in response to a certain voltage value $V_0$, controller 5 may optionally not apply (i.e., cut) the fixed current waveform (in essence suppressing the waveform, or applying a zero current waveform). This typically occurs when $V_0$ is so high that $t_1$–$t_2$=0, such that no drive current is applied at all over the period.

In another alternative, when controller 5 does not apply the fixed current waveform, it can extend the region over which it applies variable drive current, such as in FIG. 3. The variable drive current region should not, however, expand to include the full oscillation period.

When the fixed drive current is cut, the drive current sum time $(t_2-t_1)+(t_4-t_3)$ may greatly decrease. This allows for the cut portion of the fixed drive current to adjust the $t_2$ time period to $t_2'$, where $(t_2'-t_2)<(t_4-t_3)$ so that the $(t_2'-t_1)$ time period is longer based upon voltage value $V_0$.

As described above, movable member 2 oscillates responsive to drive current sent to coil 11 of fixed member 1, and the drive current is responsive to the output of sensor 6. A variable drive current drives the coil during a half-period within a full oscillation amplitude period, and a predetermined current waveform drives the coil during the other half-period. Simultaneous performance (or high speed performance) controls are therefore unnecessary, which can eliminate the expense for the same. In the alternative or in addition, other operations become possible during the output time interval.

If the fixed drive current waveform (during the other half-period) is cut, controller 5 can expand the drive current control region during a full amplitude oscillation, as in FIG. 3. When adjustment of the drive current control is carried out based upon output of the detector, drive current fluctuation within a full amplitude oscillation period can be lessened, and driving can be carried out more smoothly.

Detection of movable member displacement may be carried out during either half-period. High speed control operation becomes unnecessary.

Figure 5:
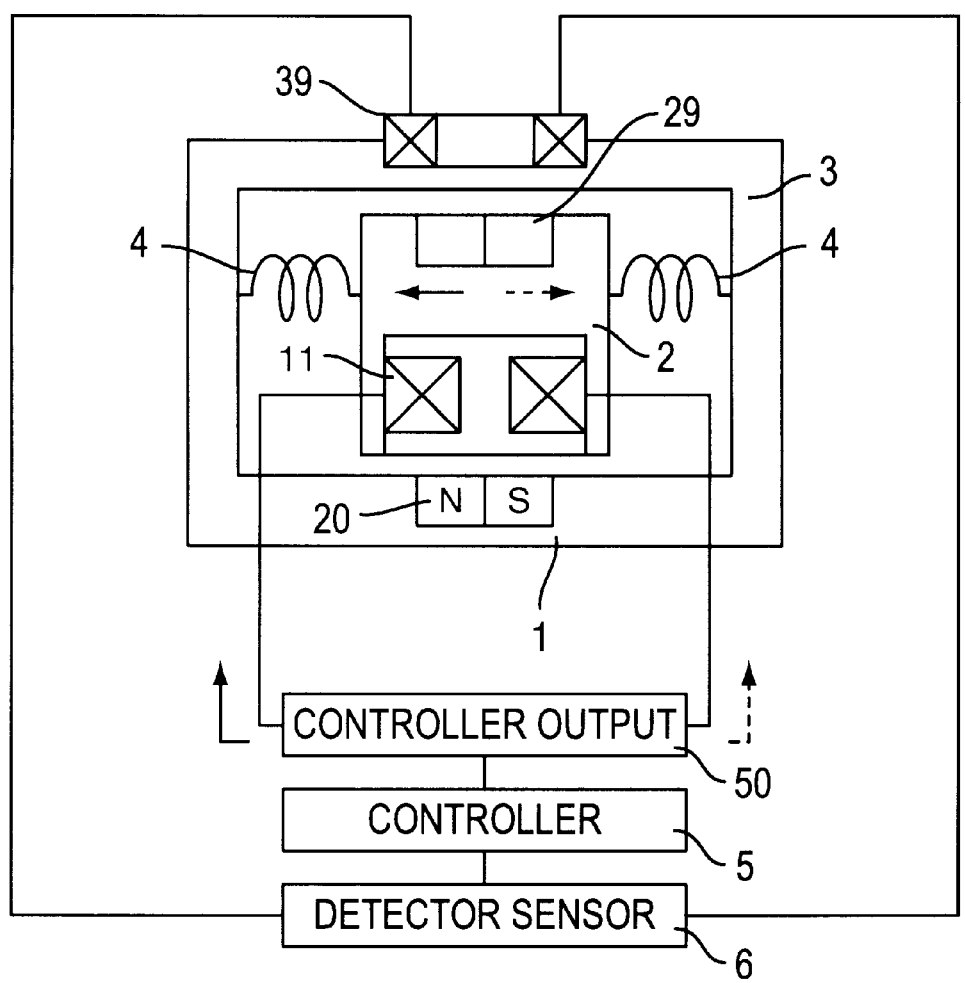
FIG. 5 is a block circuit diagram of another embodiment of the present invention.

Referring now to FIG. 5, another embodiment of the invention in which permanent magnet 20 is mounted on frame 3, and an electromagnet with coil 11 is mounted on movable member 2. The operation and performance of this embodiment is the same as that described above for the embodiment shown in FIG. 2.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

By way of non-limiting example, the application of fixed and variable currents are not limited to the specific half-periods discussed herein. Although control 5 applies the variable and fixed drive currents during the positive and negative output of coil 39 in the disclosed embodiment, the reverse also falls within the scope and spirit of the invention.

What is claimed is:

1. A method for driving a linear oscillating motor, the motor comprising a fixed magnetic member, a movable member having a magnet and supported to oscillate relative to the fixed magnetic member, a detector that detects displacement of the movable member, and a controller that oscillates the movable member by sending a drive current to a coil of the fixed magnetic member, said method comprising:

controlling, during a first half-period that occurs within a full amplitude period of the movable member, the drive current based upon the output of the detector; and controlling, during a second half-period that occurs within a full amplitude period of the movable member, the drive current based on a fixed drive current waveform.

2. The method of claim 1, further comprising:
monitoring an output of said detector, and
suppressing said fixed drive current waveform during said second half-period, such that no drive current is applied to said coil.

3. The method of claim 2, wherein during the suppression, the drive current control is adjusted based upon the output of said detector.

4. The method of claim 1, further comprising detecting displacement of the movable member during at least one of the first and second half-periods.

5. A method for driving a linear oscillating motor, the motor comprising a fixed magnetic member, a movable member having a magnet and being supported to oscillate relative to the fixed magnetic member, a detector that detects displacement of the movable member, and a controller that controls oscillation of the movable member, said method comprising:

detecting an oscillation parameter of the movable member;

triggering variable control of oscillation of the movable member, where the variable control is based upon the oscillation parameter;

terminating variable control;

triggering fixed control of oscillation of the movable member, where the fixed control is independent of the oscillation parameter; and terminating fixed control.

6. The method of claim 5, wherein said magnet is an electromagnet.

7. The method of claim 5, wherein said magnet is a permanent magent.

8. The method of claim 5, wherein following said terminating fixed control, said method repeats from one of said detecting and triggering variable control.

9. The method of claim 5, wherein said motor includes a coil, and the fixed control applies a predetermined current waveform to the coil.

10. The method of claim 9, wherein the predetermined current waveform is zero current.

11. The method of claim 9, wherein at least a portion of the predetermined current waveform is a non-zero current.

12. The method of claim 5, wherein the movable member oscillates to define a period consisting of two half-periods, variable control occurs over one of the two half-periods, and fixed control occurs over the other of the two half-periods.

13. A linear motor, comprising:

a fixed magnet;

a movable magnet supported on a movable member, said movable member being supported to oscillate over a full-period relative to said fixed magnet, said full-period including first and second half-periods;

at least one of said fixed and movable magnets having a coil;

a detector, mounted adjacent to said movable member, which generates an output voltage based upon movement of said movable member;

a control unit, said control unit outputting a drive control current to said coil over at least a portion of said first and second half-periods;

said drive control current being based upon said output voltage during said first half-period, and independent of said output voltage during said second half-period.

14. The motor of claim 13, wherein said drive control is based upon a predetermined drive current waveform during said second half-period.

15. The motor of claim 14, wherein said predetermined current waveform is zero.

16. The motor of claim 14, wherein at least a portion of said predetermined drive current waveform is not zero.

* * * * *